US010232592B2

(12) United States Patent
Loccufier et al.

(10) Patent No.: US 10,232,592 B2
(45) Date of Patent: Mar. 19, 2019

(54) LAMINATED GLASS ARTICLES (71) Applicant: AGFA NV, Mortsel (BE)

(72) Inventors: Johan Loccufier, Mortsel (BE); Rita Torfs, Mortsel (BE)

(73) Assignee: AGFA NV, Mortsel (BE)

( * ) Notice: Subject to any disclaimer, the term of this patent is extended or adjusted under 35 U.S.C. 154(b) by 81 days.

(21) Appl. No.: 15/535,119

(22) PCT Filed: Dec. 11, 2015

(86) PCT No.: PCT/EP2015/079422
§ 371 (c)(1),
(2) Date: Jun. 12, 2017

(87) PCT Pub. No.: WO2016/096652
PCT Pub. Date: Jun. 23, 2016

(65) Prior Publication Data
US 2017/0341345 A1    Nov. 30, 2017

(30) Foreign Application Priority Data
Dec. 18, 2014 (EP) ..................................... 14198763

(51) Int. Cl.
*B32B 17/10* (2006.01)
*B41M 5/50* (2006.01)
(Continued)

(52) U.S. Cl.
CPC .. *B32B 17/10266* (2013.01); *B32B 17/10036* (2013.01); *B32B 17/10302* (2013.01);
(Continued)

(58) Field of Classification Search
CPC ...... B32B 37/00; B32B 37/025; B41M 5/502; B41M 5/506; B41M 5/5209
See application file for complete search history.

(56) References Cited

U.S. PATENT DOCUMENTS

2007/0098964 A1    5/2007 Yacovone
2008/0206504 A1    8/2008 Hayes et al.
(Continued)

FOREIGN PATENT DOCUMENTS

EP    2 030 778 A1    3/2009
EP    2 711 346 A1    3/2014
(Continued)

OTHER PUBLICATIONS

Official Communication issued in International Patent Application No. PCT/EP2015/079422, dated Feb. 12, 2016.
(Continued)

*Primary Examiner* — Betelhem Shewareged
(74) *Attorney, Agent, or Firm* — Keating and Bennett, LLP (57) ABSTRACT

A method for manufacturing laminated glass articles includes the steps of inkjet printing an image with one or more inkjet inks on a first glass sheet; jetting and at least partially curing a curable sealing agent on three edges of the first glass sheet on the side for the inkjet printed image; aligning a second glass sheet with the first glass sheet on the side of the first glass sheet carrying the at least partially cured sealing agent and the inkjet printed image; applying a liquid curable adhesive resin composition into an interspace between the first and second glass sheets; and curing the liquid curable adhesive resin composition until a solid adhesive layer is obtained.

15 Claims, 2 Drawing Sheets

(51) Int. Cl.
B32B 37/00 (2006.01)
B41M 5/52 (2006.01)
B41M 5/00 (2006.01)
B44F 1/06 (2006.01)
B41M 7/00 (2006.01)

(52) U.S. Cl.
CPC .. *B32B 17/10706* (2013.01); *B32B 17/10917* (2013.01); *B32B 37/00* (2013.01); *B32B 37/025* (2013.01); *B41M 5/007* (2013.01); *B41M 5/0047* (2013.01); *B41M 5/502* (2013.01); *B41M 5/506* (2013.01); *B41M 5/5209* (2013.01); *B41M 7/0081* (2013.01); *B44F 1/066* (2013.01)

(56) References Cited

U.S. PATENT DOCUMENTS

2009/0130395 A1 5/2009 Lyon et al.
2014/0087154 A1* 3/2014 Bureloux .......... B32B 17/10036
428/203

FOREIGN PATENT DOCUMENTS

| JP | 62-275176 A | 11/1987 |
| JP | 02-73229 A | 3/1990 |
| JP | 03-273215 A | 12/1991 |
| JP | 2011-190133 A | 9/2011 |
| WO | 2005/003048 A1 | 1/2005 |
| WO | 2005/014280 A1 | 2/2005 |
| WO | 2014/048589 A1 | 4/2014 |

OTHER PUBLICATIONS

Decker et al., "UV-Curable Acrylic Resins for Production of Glass Laminates", Journal of Applied Polymer Science, vol. 55, No. 2, Jan. 10, 1995, pp. 359-369.

* cited by examiner

LAMINATED GLASS ARTICLES

CROSS-REFERENCE TO RELATED APPLICATIONS

This application is a 371 National Stage Application of PCT/EP2015/079422, filed Dec. 11, 2015. This application claims priority to European Application No. 14198763.6, filed Dec. 18, 2014, which is incorporated by reference herein in its entirety.

BACKGROUND OF THE INVENTION

1. Field of the Invention

The present invention relates to methods for making laminated glass articles with an enclosed inkjet printed image for decorative and/or informative purposes.

2. Description of the Related Art

Laminated safety glass is glass that holds together by an interlayer between two or more layers of glass when shattered. This laminated glass is typically used as a windshield for the front window of a vehicle.

Laminated glass has also been prepared for decorative purposes. An example of using an inkjet printed polyvinyl-butyral sheet to make decorative glass laminates is given by WO 2005/014280 (DUPONT). Similar methods for making laminated glass have also been disclosed by EP 2030778 A (BRIDGESTONE), US 2006078716 (SOLUTIA) and EP 1741552 A (DIGIGLASS). In all cases, high temperatures and a vacuum for removing air bubbles between two glass layers are required to bind the polymeric sheet to the glass. This can be accomplished in an autoclave operating usually at temperatures of 130° C. and more.

A new approach has been suggested in WO 2014/048589 (FALCO TECHNOLOGIES), wherein a method for manufacturing a multi-layered decorative panel comprising at least the steps of: providing a digitally printed rigid panel (10) by applying a digitally printed image (5) onto a first rigid panel (2, 3, 6); providing another rigid panel (2, 3, 6) and registering the other rigid panel (2, 3, 6) with the digitally printed rigid panel (10), the digitally printed image (5) being directed towards the inner side of the decorative panel (1); wherein at least one of the rigid panels (2, 3, 6) is transparent; applying the liquid adhesive resin between the registered other rigid panel (2, 3, 6) and the digitally printed rigid panel (10) using the lamination process as mentioned above; and curing the liquid adhesive resin until a solid adhesive layer (7) is obtained. However, the use of a double sided tape for registering the other rigid panel (2, 3, 6) with the digitally printed rigid panel (10) requires many manual operations and reduces the productivity of the manufacturing process. Furthermore the application of the tape also leads to non-closed areas between tapes along different edges of a glass sheet, which have to be sealed with a non-acidic silicone or with a hot melt glue/adhesive, as crossover of the tape creates new non-closed areas.

Hence, there is still a need for an improved method for making laminated safety glass having a decorative pattern between two glass sheets.

SUMMARY OF THE INVENTION

In order to overcome the problems described above, preferred embodiments of the present invention provide a method for manufacturing laminated glass articles as described below.

Further objects of the invention will become apparent from the description hereinafter.

DETAILED DESCRIPTION OF THE PREFERRED EMBODIMENTS

Definitions

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester group, amide group, ether group, thioether group, ketone group, aldehyde group, sulfoxide group, sulfone group, sulfonate ester group, sulphonamide group, —Cl, —Br, —I, —OH, —SH, —CN and —NO$_2$.

Methods of Manufacturing Laminated Glass Articles

Figure 1:
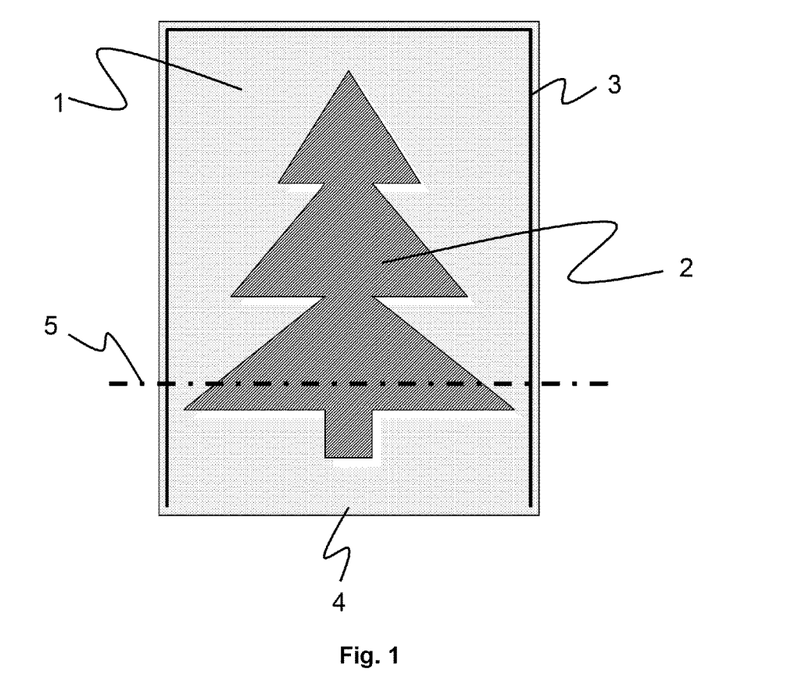
FIG. 1 shows a first glass sheet (1) which has been provided with an inkjet image (2) and a sealing agent (3) along the four edges of the first glass sheet 1 but leaving an opening as the adhesive entry (4).
Figure 2:
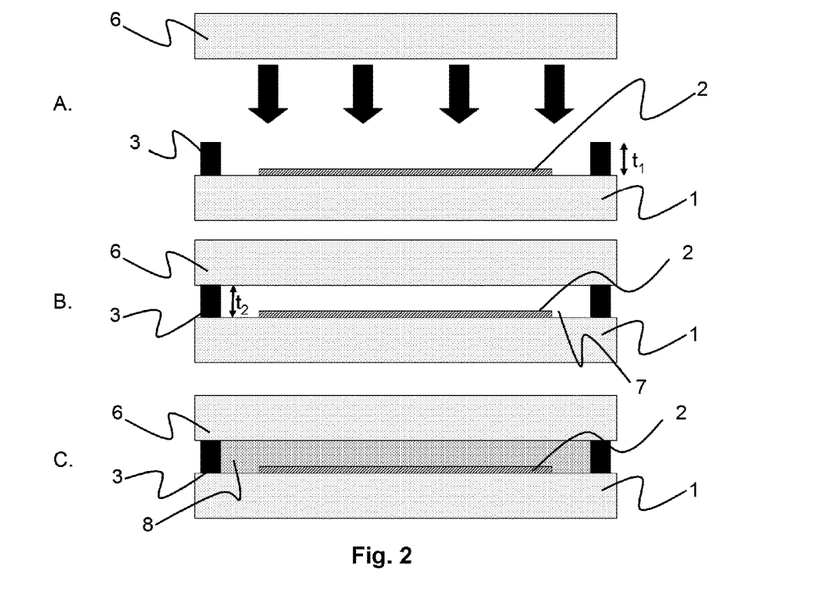
FIG. 2 illustrates the method of making decorative glass articles in three steps A to C. In step A, a cross section along cross section line (5) of FIG. 1 shows the first glass sheet (1) which has been provided with an inkjet image (2) and a sealing agent (3) having a thickness $t_1$, while a second glass sheet (6) is in the process of being aligned onto the first glass sheet (1). Step B shows that after alignment of the first and second glass sheets (1,6) an interspace (7) has been created locating the first and second glass sheets (1,6) at a distance $t_2$ of each other. In step C, the interspace (7) has been filled with a curable liquid adhesive resin composition (8).

A method for manufacturing laminated glass articles according to the invention includes the steps of:
- inkjet printing an image (2) with one or more inkjet inks on a first glass sheet (1);
- jetting and at least partially curing a curable sealing agent (3) on three edges of the first glass sheet (1) on the side for the inkjet printed image (2);
- aligning a second glass sheet (6) with the first glass sheet (1) on the side of the first glass sheet (1) carrying the at least partially cured sealing agent (3) and the inkjet printed image (2);
- applying a liquid curable adhesive resin composition (8) into an interspace (7) between the first and second glass sheets (1,6); and
- curing the liquid curable adhesive resin composition (8) until a solid adhesive layer is obtained.

In one embodiment, a primer is jetted on the glass surface of the first glass sheet and the one or more inkjet inks are jetted on the primer. The primer improves the adhesion of the one or more inkjet inks to the first glass sheet, so that standard UV curable inkjet inks can be used.

In a more preferred embodiment, the one or more inkjet inks are jetted directly on the glass surface of the first glass sheet. For printing directly on the glass, specific UV curable inkjet inks are used that adhere well to glass.

In a preferred embodiment, at least one of the curable liquid adhesive resin composition, the one or more inkjet inks and the primer contains a polyvinylacetal polymer, more preferably the polyvinylacetal polymer is a polyvinyl butyral.

Curable Sealing Agents

The curable sealing agent is preferably a UV curable sealing agent, preferably containing at least one free radical photoinitiator, a polymerizable composition consisting for at least 95 wt % out of monofunctional (meth)acrylates, wherein at least 80 wt % of the monofunctional (meth)acrylates is composed of monofunctional (meth)acrylates comprising at least one five or six membered acetal ring in their structure, and an acetal containing polymer having a plurality of repeating units according to Formula (II):

Formula (II)

wherein R1 and R2 are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and substituted or unsubstituted aryl or heteoraryl group. The acetal containing polymer is preferably a polyvinylacetal polymer, more preferably a polyvinyl butyral.

The UV curable sealing agent preferably contains a pigment, preferably an inorganic pigment, like silica or titanium dioxide, preferably in an amount of at least 20 wt % based upon the total weight of the UV curable sealing agent. In an amount of 20 wt %, the composition is able to withstand the pressure of the second glass sheet (6) better so that the difference $t_1-t_2$ is minimized. The functioning principle is comparable to that of concrete where the addition of small stones makes the composition stronger.

The curable sealing agent is preferably fully cured after the alignment of the first and second glass sheets.

The pigment in the UV curable sealing agent is preferably an inorganic pigment, a colour pigment or a mixture thereof.

Primers and Inkjet Inks

A primer may be applied, preferably by jetting, on the glass surface of the first glass sheet and the one or more inkjet inks are then jetted on the primer. The primer improves the adhesion of the one or more inkjet inks to the first glass sheet, so that standard UV curable inkjet inks can be used.

This primer may form an organic layer or a hybrid organic-inorganic layer. With a hybrid organic-inorganic layer is meant a layer that is composed of both organic constituents and inorganic constituents. Examples of organic constituents are polyacrylate or polyester polymers. Examples of inorganic constituents may be silanes or metal-organic compounds. This primer layer typically has a thickness of less than 50 μm, more preferably less than 10 μm.

The primer may be silane based. Preferably, the silane based primer includes a photoinitiator and at least one free radical polymerizable silane selected from the group consisting of methacryloxypropyl trimethoxysilane, acryloxypropyl trimethoxysilane, methacryloxypropyl tris(trimethylsiloxy)silane, methacryloxypropyl triethoxysilane, acryloxypropyl triethoxysilane, methacryloxypropyl triisopropoxysilane, 2-(3,4-epoxycyclohexyl) ethyltrimethoxysilane, 5,6-epoxyhexyl trimethoxysilane, 5,6-epoxy triethoxysilane, (3-glycidoxypropyl)methyl diethoxysilane, (3-glycidoxypropyl) methyldimethoxysilane, (3-glycidoxypropyl) dimethylethoxy silane, (3-glycidoxypropyl) bis(trimethylsiloxy) methylsilane, (3-glycidoxypropyl) trimethoxysilane and/or mixtures thereof.

The primer preferably includes methacryloxypropyltrimethoxysilane.

The one or more inkjet inks are preferably UV curable inkjet inks. If they are jetted upon a primer they can be standard UV curable inkjet inks. However preferably no primer is used and the UV curable inkjet inks are jetted directly on the glass surface of the first glass sheet (1).

A preferred UV curable inkjet ink for jetting directly on glass contains at least one free radical photoinitiator, a polyfunctional propoxylated acrylate and a monofunctional ethoxylated methacrylate according to Formula (I):

Formula (I)

with n representing an integer of 1 to 4 and R representing an alkyl group, a alkenyl group or a alkynyl group.

A particularly preferred UV curable inkjet ink for jetting directly on glass contains at least one free radical photoinitiator and at least 30 wt % of a mixture including 0 to 45 wt % of a polymerizable oligomer, at least 5 wt % of a polyfunctional propoxylated acrylate and at least 20 wt % of a monofunctional ethoxylated methacrylate according to Formula (I):

Formula (I)

with n representing an integer of 1 to 4 and R representing an alkyl group, a alkenyl group or a alkynyl group; wherein the weight ratio of the polyfunctional propoxylated acrylate over the monofunctional ethoxylated methacrylate is less than 1.60; and wherein all the weight percentages wt % are based on the total weight of the UV curable inkjet ink.

In addition to the polyfunctional propoxylated acrylate and the monofunctional ethoxylated methacrylate, the UV curable inkjet ink preferably contains at least one polymerizable oligomer.

The polymerizable oligomer is preferably a urethane acrylate, and may be an aliphatic urethane acrylate or an aromatic urethane acrylate, but is preferably an aliphatic urethane acrylate. Preferred urethane acrylate oligomers are the CN9xx-grades from ARKEMA, such as preferably CN963B80, CN9001, CN9002, CN976, CN9900, CN965, and CN966H90.

In another preferred embodiment, the polymerizable oligomer is an epoxy acrylate, more preferably an aromatic epoxy acrylate. Preferred epoxy acrylate oligomers are the CN1xx-grades from ARKEMA, such as preferably CN UVE 151, CN113D70, CN131B and CN132.

A mixture of two or more polymerizable oligomers may be used.

Another preferred UV curable inkjet ink for jetting directly on glass contains at least one free radical photoinitiator, a polymerizable composition consisting for at least 95 wt % out of monofunctional (meth)acrylates, wherein at least 80 wt % of the monofunctional (meth)acrylates is composed of monofunctional (meth)acrylates comprising at least one five or six membered acetal ring in their structure, and an acetal containing polymer having a plurality of repeating units according to Formula (II):

Formula (II)

wherein R1 and R2 are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and substituted or unsubstituted aryl or heteoraryl group.

The acetal containing polymer is preferably a polyvinylacetal polymer, more preferably a polyvinyl butyral.

The above UV curable inkjet inks for jetting directly on glass may be colourless, but preferably they contain a colorant, preferably a colour pigment. A colourless UV curable inkjet ink can be used as a primer on glass. The advantage of such a colourless UV curable inkjet ink is that it can be applied image-wise. Standard UV curable inkjet inks can then be jetted on the image-wise applied primer.

However, by using the above UV curable inkjet inks for jetting directly on glass as coloured UV curable inkjet inks, the use of a primer can be omitted, making the method for manufacturing laminated glass articles according to the invention more simpler and economical.

The UV curable inkjet inks may include other components like one or more inhibitors and/or one or more surfactants in amounts that are desired to be jettable and curable by inkjet printers.

In a preferred embodiment, the UV curable inkjet ink according to the invention contains at least 60 wt %, more preferably 70 wt %, and most preferably 75 wt % of polymerizable compounds, wherein the wt % is based on the total weight of the UV curable inkjet ink.

In a preferred embodiment, the UV curable inkjet inks are part of a UV curable inkjet ink set, preferably a UV curable CMYK inkjet ink set.

A UV curable CMYK-inkjet ink set may also be extended with extra inks such as red, green, blue, and/or orange to further enlarge the colour gamut of the image. A UV curable inkjet ink set may also be extended by the combination of full density inkjet inks with light density inkjet inks. The combination of dark and light colour inks and/or black and grey inks improves the image quality by a lowered graininess.

The UV curable inkjet ink set preferably may also include a white inkjet ink.

The surface tension of the UV curable inkjet inks is preferably from 20 to 50 mN/m at 25° C., more preferably from 22 to 35 mN/m at 25° C. It is preferably 20 mN/m or more from the viewpoint of printability by a second UV curable inkjet ink, and it is preferably not more than 35 mN/m from the viewpoint of the wettability.

In one embodiment, the surface tension of a colourless UV curable inkjet ink used as primer is at least 2 mN/m larger than the surface tension of one or more UV curable inkjet inks containing a colorant that are jetted on the primer. This allows obtaining a good image quality for the colour inkjet inks on the primer.

The surface tension of the UV curable colourless primer and the inkjet inks is preferably from 20 to 50 mN/m at 25° C., more preferably from 22 to 35 mN/m at 25° C. It is preferably 20 mN/m or more from the viewpoint of printability by a second UV curable inkjet ink, and it is preferably not more than 35 mN/m from the viewpoint of the wettability of the substrate.

For having a good ejecting ability, the viscosity of the UV curable inkjet inks at the jetting temperature is preferably smaller than 100 mPa·s, more preferably smaller than 50 mPa·s at a shear rate of 1,000 s$^{-1}$ and at 45° C.

Liquid Curable Adhesive Resin Compositions

The liquid curable adhesive resin composition is preferably liquid at a temperature of 25° C. and may be cured any one of thermal curing, electron beam curing, chemical curing, and UV-curing The adhesive resin is chosen from a one or multiple component acrylate-type, polyester-type, epoxy-type, polyurethane-type adhesive resin and/or combinations thereof.

In a preferred embodiment, the liquid curable adhesive resin composition is an UV-curable acrylic-PU resin composition having a viscosity of 5 to 200 mPa·s, more preferably 7 to 75 mPa·s at 25° C.

In another preferred embodiment, the liquid curable adhesive resin composition is a polyester resin having a viscosity of 100 to 160 mPa·s at 23° C. and a gel time of 89 to 121 minutes at 20° C.

In a preferred embodiment, the liquid curable adhesive resin composition is a two-component polyurethane resin.

The properties of liquid curable adhesive resin compositions may be enhanced by means of additives such as ultraviolet radiation absorbers, pigments, bubble evacuating additives and the like.

In another preferred embodiment, the curable liquid adhesive resin composition contains an acetal containing polymer, preferably a polyvinylacetal polymer, more preferably a polyvinyl butyral.

The curable liquid adhesive resin preferably contains at least one free radical photoinitiator, a polymerizable composition consisting for at least 95 wt % out of monofunctional (meth)acrylates, wherein at least 80 wt % of the monofunctional (meth)acrylates is composed of monofunctional (meth)acrylates comprising at least one five or six membered acetal ring in their structure, and an acetal containing polymer having a plurality of repeating units according to Formula (II):

Formula (II)

wherein R1 and R2 are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and substituted or unsubstituted aryl or heteoraryl group.

The curable liquid adhesive resin composition preferably contains the acetal containing polymer in an amount of at least 5 wt %, and preferably no more than 15 wt %, wherein all wt % are based on the total weight of the curable liquid adhesive resin composition.

Spacing Agents

Figure 3:
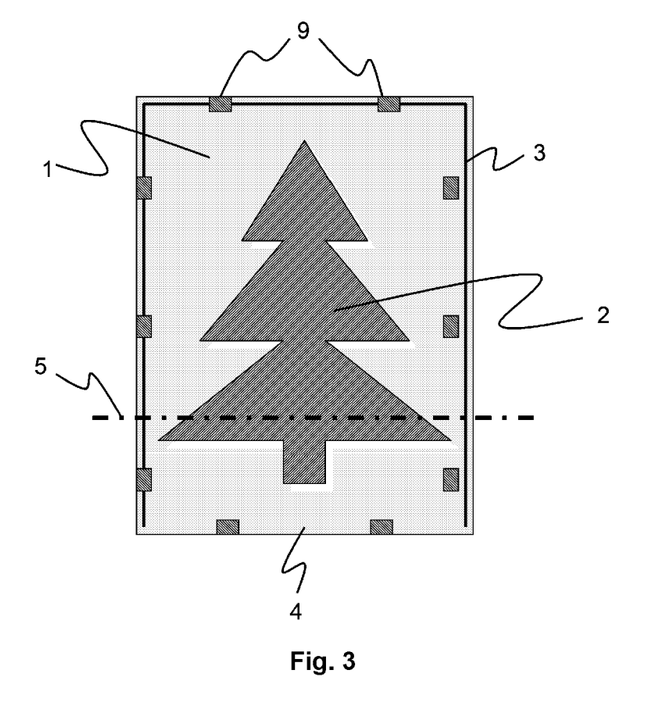
FIGS. 3 and 4 are identical to FIG. 1 with the exception that spacing agents (9) are used to accurately control the distance $t_2$ between the first and second glass sheets (1,6) in FIG. 2.
Figure 4:
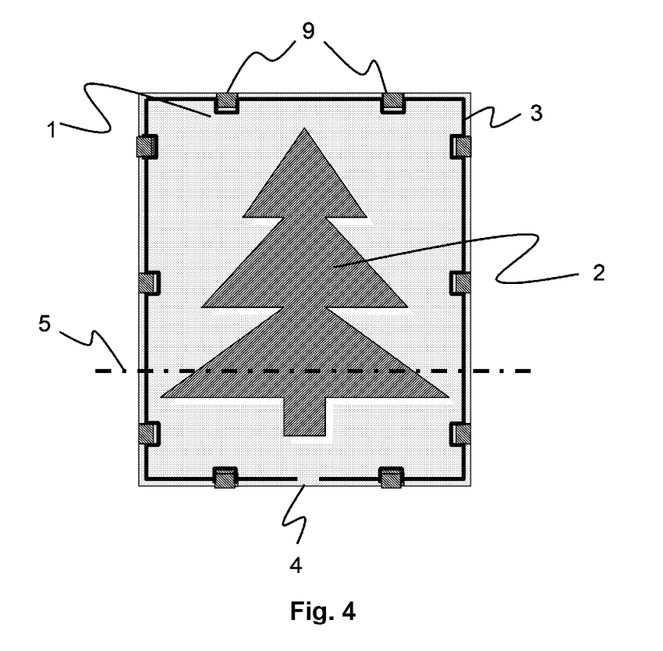

The spacing agents (9) in FIGS. 3 and 4 serve the purpose of accurately controlling the distance $t_2$ between the first glass sheet (1) and the second glass sheet (6). The distance $t_2$ determines the amount of liquid curable adhesive resin composition (8) that fills up the interspace (7) between the first and second glass sheets (1,6) and thus also the strength of the decorative glass. Generally the height $t_1$ of the curable sealing agent (3) is reduced under the weight of the second glass sheet (6) to the distance $t_2$.

The spacing agents are made of solid matter. In the most preferred embodiment, the spacing agents are small glass plates. Typical dimensions of a spacing agent may be a length of 20 mm×10 mm×$t_2$ mm. The value of $t_2$ is preferably between 0.1 and 10 mm, more preferably between 0.2 and 4 mm, most preferably between 0.4 and 2 mm.

The spacing agents may be colourless or coloured. Especially in the case of laminated safety glass for decorative purposes, coloured spacing agents may be advantageously used for aesthetical reasons.

The spacing agents, e.g. glass plates, may be removed after curing the liquid curable adhesive resin composition (8) to a solid adhesive layer. The holes created by the removal of the spacing agents, may be filled up with liquid curable adhesive resin composition and cured.

However preferably the spacing agents, especially in the case of glass plates, are not removed and become an integral part of the laminated safety glass. In order to accomplish the latter, an adhesive is preferably provided onto one or more sides, preferably at least the sides facing the first and second glass sheets. The adhesive may be the same as used for the sealing agent (3) or for the liquid curable adhesive resin composition (8). The adhesive may be applied manually, but is preferably applied by the same tools as used for applying the sealing agent (3) and the liquid curable adhesive resin composition (8). When applied manually, the adhesive can, for example, be applied onto the spacing agent by a brush or by a syringe. Alternatively, the adhesive may also be applied on the first glass sheet and the spacing agent may be pressed onto this adhesive, whereafter preferably an adhesive is also applied to the side of the spacing agent facing the second glass sheet.

Laminated Glass Articles

The manufacturing method results in low cost, impact proof, easy-to-clean, strong and light laminated glass articles. Furthermore, by arranging the inkjet printed image between the first and second glass sheets (1,6), this inkjet printed image is protected from abrasion, moisture, air, chemicals and pollution.

The first and second glass sheets (1,6) are preferably flat glass sheets, but they may also have a curvature. For example, in the case of windshields for cars, preferably the first and second glass sheets may have a curvature prior to the lamination process. Instead of car windshields, curved laminated glass articles can also be used e.g. as building materials for houses and buildings, where they serve a decorative or information purpose.

A flat laminated glass article manufactured according to the invention can, for example, be used as part of a floor, wherein the inkjet printed image (2) does not suffer from wear by people walking on the glass floor. The inkjet printed image (2) may be decorative or may be informative, e.g. for giving directions towards a certain destination in a building. As the decorative and informative laminated glass articles can now be made in a much more efficient manner resulting in a reduced end price for the customer, they also possess a much higher affordability.

The first and second glass sheets (1,6) can each independently be selected from a soda-lime glass sheet or a quartz glass sheet. Quartz glass sheets are more expensive but have the property of being more transparent for UV light than soda-lime glass sheets.

Inkjet Printed Images

There are no restrictions on the content of the image, it can be purely decorative, purely informative or a mixture of both. The image can be a single colour image or a multi colour image.

The laminated glass article can, for example, be used for home decoration, for commercial applications as advertising and the like.

Flexibility is the main advantage of inkjet printing due to its capacity of variable image printing. For example, an original image may be split up into a plurality of sub-images on a plurality of laminated glass articles. This plurality of laminated glass articles is then assembled in the right configuration, for example as a large glass wall of a building, to recompose the original image.

The image may be visible by the naked eye or not. For example, the image may be inkjet printed using a substantially colourless UV fluorescent inkjet ink, wherein the inkjet printed image only becomes visible upon exposure to UV light.

Photoinitiating System

The UV curable sealing agents, the liquid UV curable adhesive resin composition, the UV curable primer and/or the UV curable inkjet inks contain at least one free radical photoinitiator, but may contain a photoinitiating system including a plurality of photoinitiators and/or co-initiators.

A free radical photoinitiator is a chemical compound that initiates polymerization of monomers and oligomers when exposed to actinic radiation by the formation of a free radical.

Two types of free radical photoinitiators can be distinguished and used in the UV curable inkjet ink of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

In order to increase the photosensitivity further, the UV curable ink may additionally contain co-initiators. Preferred examples of co-initiators can be categorized in three groups: (1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate; and
(3) (meth)acrylated amines such as dialkylamino alkyl (meth)acrylates (e.g., diethylaminoethylacrylate) or N-morpholinoalkyl-(meth)acrylates (e.g., N-morpholinoethylacrylate).

The most preferred co-initiators are aminobenzoates.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzyl dimethylketal, bis(2,6-dimethylbenzoyl)-2,4,4-trimethylpentylphosphine oxide, 2,4,6trimethylbenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

In a preferred embodiment, the photoinitiator is selected from the group consisting of non-polymeric multifunctional photoinitiators, oligomeric or polymeric photoinitiators and polymerizable photoinitiators. Such a diffusion hindered photoinitiator exhibits a much lower mobility in a cured layer of the UV curable inkjet inks than a low molecular weight monofunctional photoinitiator, such as benzophenone. Including diffusion hindered photoinitiators, and also diffusion hindered co-initiators do not only have a safety advantage for the operator of the inkjet printer, but are also environmentally friendly as these compounds cannot be leached out by e.g. acid rain.

Most preferably the diffusion hindered photoinitiator is a polymerizable photoinitiator, preferably having at least one acrylate group. And most preferably the diffusion hindered coinitiator is a polymerizable coinitiator, preferably having at least one acrylate group.

Suitable diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulfides, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2053101 A (AGFA GRAPHICS) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2065362 A (AGFA) and EP 2161264 A (AGFA), incorporated herein by reference.

In a preferred embodiment, the UV curable colourless primer includes no thioxanthone type photoinitiator. UV curable colourless primers including thioxanthone type photoinitiators generally exhibit strong photoyellowing.

A preferred amount of photoinitiator is 0-50 wt %, more preferably 0.1-20 wt %, and most preferably 0.3-15 wt % of the total weight of the UV curable sealing agent, the liquid UV curable adhesive resin composition, the UV curable primer or the UV curable inkjet inks.

Preferred diffusion hindered co-initiators are the polymerizable co-initiators disclosed in EP 2053101 A (AGFA GRAPHICS) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 (AGFA) incorporated herein as a specific reference.

The UV curable ink preferably comprises the diffusion hindered co-initiator in an amount of 0.1 to 50 wt %, more preferably in an amount of 0.5 to 25 wt %, most preferably in an amount of 1 to 10 wt % of the total weight of the UV curable sealing agents, the liquid UV curable adhesive resin composition, the UV curable primer or the UV curable inkjet inks.

Polymerization Inhibitors

The UV curable sealing agent, the liquid UV curable adhesive resin composition, the UV curable primer and/or the UV curable inkjet inks may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % based on the total weight of the UV curable sealing agents, the liquid UV curable adhesive resin composition, the UV curable primer or the UV curable inkjet inks.

Colorants

The colorants used in the UV curable inkjet inks can be a combination of pigments and dyes, but preferably consist of colour pigments. Organic and/or inorganic pigments may be used.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Suitable pigments are disclosed in paragraphs [0128] to [0138] of WO 2008/074548 (AGFA GRAPHICS).

In a preferred embodiment, the UV curable inkjet inks is a UV curable yellow inkjet ink including a pigment selected from the group consisting of C.I Pigment Yellow 150, C.I Pigment Yellow 151, C.I Pigment Yellow 155 and C.I Pigment Yellow 180.

A preferred pigment for the cyan inkjet ink is C.I. Pigment Blue 15:4.

A preferred pigment for the magenta inkjet ink is preferably selected from the group consisting of diketopyrrolopyrrole pigments, quinacridone pigments and mixed crystals thereof.

Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions.

Preferred mixed crystals contain at least 70% of unsubstituted quinacridone. A commercially available example is Cinquasia™ Magenta RT-355-D from Ciba Specialty Chemicals.

Also mixtures of pigments may be used in the UV curable colour inkjet inks. A UV curable neutral black inkjet ink is preferred and can be obtained, for example, by mixing a black pigment and a cyan pigment and/or magenta pigment into the ink.

Non-organic pigments may be used in the pigment dispersions. Particular preferred pigments are C.I. Pigment Metal 1, 2 and 3. Illustrative examples of the inorganic pigments include red iron oxide (III), cadmium red, ultramarine blue, prussian blue, chromium oxide green, cobalt green, amber, titanium black and synthetic iron black.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. An average particle size smaller than 0.050 µm is less desirable for decreased light-fastness.

However for white pigment inkjet inks, the numeric average particle diameter of the white pigment is preferably from 150 to 500 nm, more preferably from 200 to 400 nm, and most preferably from 250 to 300 nm. Sufficient hiding power cannot be obtained when the average diameter is less than 150 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

Suitable white pigments are given by Table 2 in [0116] of WO 2008/074548 (AGFA). The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548 (AGFA).

The pigments are present in the range of 0.01 to 15%, more preferably in the range of 0.05 to 10% by weight and most preferably in the range of 0.1 to 5% by weight, each based on the total weight of the inkjet ink. For white pigmented ink, the white pigment is preferably present in an amount of 3% to 30% by weight of the inkjet ink, and more preferably 5% to 25%. An amount of less than 3% by weight cannot achieve sufficient covering power and usually exhibits very poor storage stability and ejection property.

Polymeric Dispersants

If the colorant in the UV curable inkjet ink is a pigment, then the UV curable inkjet ink preferably contains a dispersant, more preferably a polymeric dispersant, for dispersing the pigment.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);
gradient (tapered) polymerized monomers (e.g. monomers A and B polymerized into AAABAABBABBB);
block copolymers (e.g. monomers A and B polymerized into AAAAABBBBBB) wherein the block length of each of the blocks (2, 3, 4, 5 or even more) is important for the dispersion capability of the polymeric dispersant;
graft copolymers (graft copolymers consist of a polymeric backbone with polymeric side chains attached to the backbone); and
mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA).

Commercial examples of polymeric dispersants are the following:
DISPERBYK™ dispersants available from BYK CHEMIE GMBH;
SOLSPERSE™ dispersants available from NOVEON;
TEGO™ DISPERS™ dispersants from EVONIK;
EDAPLAN™ dispersants from MÜNZING CHEMIE;
ETHACRYL™ dispersants from LYONDELL;
GANEX™ dispersants from ISP;
DISPEX™ and EFKA™ dispersants from CIBA SPECIALTY CHEMICALS INC;
DISPONER™ dispersants from DEUCHEM; and
JONCRYL™ dispersants from JOHNSON POLYMER.

Dispersion Synergists

A dispersion synergist usually consists of an anionic part and a cationic part. The anionic part of the dispersion synergist exhibiting a certain molecular similarity with the colour pigment and the cationic part of the dispersion synergist consists of one or more protons and/or cations to compensate the charge of the anionic part of the dispersion synergist.

The synergist is preferably added in a smaller amount than the polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

Suitable dispersion synergists that are commercially available include Solsperse™ 5000 and Solsperse™ 22000 from NOVEON.

Particular preferred pigments for the magenta ink used are a diketopyrrolo-pyrrole pigment or a quinacridone pigment. Suitable dispersion synergists include those disclosed in EP 1790698 A (AGFA), EP 1790696 A (AGFA), WO 2007/060255 (AGFA) and EP 1790695 A (AGFA).

In dispersing C.I. Pigment Blue 15:3, the use of a sulfonated Cu-phthalocyanine dispersion synergist, e.g. Solsperse™ 5000 from NOVEON is preferred. Suitable dispersion synergists for yellow inkjet inks include those disclosed in EP 1790697 A (AGFA).

Surfactants

The UV curable inkjet ink inkjet ink must meet stringent performance criteria in order to be adequately jettable with high precision and reliability during an extended period of time. In order to achieve this, the surface tension of the ink is reduced by the addition of one or more surfactants. In the case of UV curable inkjet inks, however, the surface tension of the inkjet ink is not only determined by the amount and type of surfactant, but also by the polymerizable compounds, the polymeric dispersants and other additives in the ink composition.

The surfactant can be anionic, cationic, non-ionic, or zwitter-ionic and is usually added in a total quantity less than 1 wt % based on the total weight of the UV curable inkjet ink.

Suitable surfactants include fluorinated surfactants, fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoro surfactants (such as fluorinated hydrocarbons) and silicone surfactants. The silicone surfactants are preferably siloxanes and can be alkoxylated, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preparation of Inkjet Inks

The preparation of pigmented UV curable inkjet inks is well-known to the skilled person. Suitable methods of preparation are disclosed in paragraphs [0076] to [0085] of WO 2011/069943 (AGFA).

A preferred method of manufacturing a UV curable inkjet ink according to the invention includes at least the steps of: a) making a polymerizable composition with one or more monomers or oligomers; and b) adding at least one free radical photoinitiator to the polymerizable composition; wherein the UV curable inkjet ink contains at least 30 wt % of a mixture including at least 5 wt % of a polyfunctional propoxylated acrylate and at least 20 wt % of a monofunctional ethoxylated methacrylate according to Formula (I):

Formula (I)

with n representing an integer of 1 to 4 and R representing an alkyl group, a alkenyl group or a alkynyl group; wherein the weight ratio of the polyfunctional propoxylated acrylate over the monofunctional ethoxylated methacrylate is less than 1.60; and wherein all the weight percentages wt % are based on the total weight of the UV curable inkjet ink.

Inkjet Printing Devices

The curable sealing agent, the curable primer, if any, and the UV curable inkjet inks are preferably all jetted by an inkjet printing device, more preferably the same inkjet printing device. They may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type.

Preferred piezoelectric print heads are so-called though flow piezoelectric print heads available from sources such as XAAR, RICOH and Toshiba TEC. In these through flow print heads, the ink is recirculated in the inkjet printing device via an inlet and outlet of the print head, whereby sedimentation of dense pigment particles is largely prevented.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

A preferred print head for the curable sealing agent is a so-called valve jet print head, especially if the curable sealing agent includes a high amount of polymer, such as polyvinyl butyral. Preferred valve jet print heads have a nozzle diameter between 45 and 600 μm. This allows for a resolution of 15 to 150 dpi which is preferred for having high productivity while not comprising image quality.

Valve jet print heads are commercially available, for example as Chromo Jet™ 200, 400 and 800 from Zimmer and Printos™ P16 from VideoJet.

In a preferred embodiment, the inkjet printing device includes one or more valve jet print heads. The valve jet print head preferably jets droplets of 1 to 1500 nanoliter, which is much more than the picoliter droplets jetted by most piezoelectric inkjet printing systems. Also higher viscosities of the curable sealing agent can be handled. By jetting nanoliter instead of picoliters, the thickness $t_1$ of the curable sealing agent can be achieved in a fast, productive manner.

UV Curing Devices

The UV curable sealing agents, the liquid UV curable adhesive resin composition, the UV curable primer and the UV curable inkjet inks are cured by exposure to ultraviolet radiation. The UV curing means may be arranged in combination with the print head of the inkjet printer, travelling therewith so that the UV curable inkjet ink is exposed to curing radiation very shortly after been jetted.

In such an arrangement it can be difficult to provide a small enough radiation source connected to and travelling with the print head, such as LED. Therefore, a static fixed radiation source may be employed, e.g. a source of curing UV-light, connected to the radiation source by means of flexible radiation conductive means such as a fibre optic bundle or an internally reflective flexible tube. Alternatively, the actinic radiation may be supplied from a fixed source to the radiation head by an arrangement of mirrors including a mirror upon the radiation head. However preferably UV LEDs are connected to and travelling with the print head.

The source of radiation may also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

In a preferred embodiment, the UV curing is performed by UV LEDs only. The inkjet printing device preferably contains one or more UV LEDs preferably with a wavelength larger than 360 nm, preferably one or more UV LEDs with a wavelength larger than 380 nm, and most preferably UV LEDs with a wavelength of about 395 nm.

Furthermore, it is possible to cure using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All materials used in the following examples were readily available from standard sources such as ALDRICH CHEMICAL Co. (Belgium) and ACROS (Belgium) unless otherwise specified.

TiO2 is an abbreviation used for Ti-Pure R-706, a titanium dioxide pigment from DuPont.

PB7 is an abbreviation used for Special Black™ 550, which is a carbon black from EVONIK DEGUSSA.

Ink Jet Yellow™ 4GC is a yellow colour pigment from CLARIANT.

Pioloform™ BL16 is a poly(vinyl acetal-co-vinyl butyral), supplied by Wacker.

E7701 is a polyacrylate dispersion agent available as Efka™ 7701 from BASF.

Solsperse™ 35000 is a polymeric dispersant from LUBRIZOL.

INHIB is a mixture forming a polymerization inhibitor having a composition according to Table 1.

TABLE 1

| Component | wt % |
|---|---|
| DPGDA | 82.4 |
| p-methoxyphenol | 4.0 |
| BHT | 10.0 |
| Cupferron ™ AL | 3.6 |

Cupferron™ AL is aluminum N-nitrosophenylhydroxylamine from WAKO CHEMICALS LTD.

BHT is an abbreviation for 2,6-di-tert.butyl-4-methylphenol (CASRN128-37-0) from ALDRICH CHEMICAL CO.

THFA is tetrahydrofurfuryl acrylate available as Sartomer™ 285 from Arkema

LTM is a liquid photo initiator blend available as Genocure LTM from Rahn

MBF is methyl benzoylformate, a photo initiator available as Genocure MBF from Rahn.

IC819 is a bis(2,4,6-trimethylbenzoyl)-phenylphosphineoxide photoinitiator available as Irgacure™ 819 from BASF.

TPO-L is 2,4,6-trimethylbenzoyl phenylphosphinic acid ethyl ester available as Lucirin TPO-L from BASF.

ITX is a mixture of 2-isopropyl-thioxanthone and 4-isopropyl-thioxanthone available as Quantacure ITX from RAHN AG.

EPD is ethyl 4-dimethylaminobenzoate, available under the trade name of Genocure™ EPD from RAHN AG.

UV3510 is a polyether modified polydimethylsiloxane, a surfactant available as BYK™ UV3510 from BYK Chemie CN151 is an epoxy acrylate oligomer CN UVE 151 from Arkema EOEOEMA is ethoxyethoxy ethyl methacrylate from ABCR SR9003 is propoxylated neopentyl glycol diacrylate, available from Arkema SR 531 is a monofunctional acrylate having the following structure, supplied by Sartomer.

SR339C is phenoxyethyl acrylate supplied by Sartomer.

DPGDA is dipropylene glycol diacrylate available as SR508 from Arkema

Measurement Methods

1. Average Particle Size

The average particle size of pigments in a pigment dispersion was determined with photon correlation spectroscopy at a wavelength of 633 nm with a 4 mW HeNe laser on a diluted sample of the pigment dispersion. The particle size analyzer used was a Malvern™ nano-S from Goffin-Meyvis.

The sample was prepared by addition of one drop of pigment dispersion to a cuvette containing 1.5 mL ethyl acetate and mixed until a homogenous sample was obtained. The measured particle size is the average value of 3 consecutive measurements of 6 runs of 20 seconds.

2. Adhesion on Glass

For testing adhesion the cross hatch cutter set Elcometer 1542 was used. The distance between the applied scratches is 1 mm. A 5 cm long strip of Tesatape™ 4104 PVC tape was pressed on to the cross cut inkjet ink. The tape was pressed four times with the thumb before removing it in one sharp pull. The adhesion was then evaluated in accordance with the evaluation values described in Table 2.

TABLE 2

| Evaluation value | Observation |
|---|---|
| 0 | Nothing removed, perfect adhesion. |
| 1 | Detachment of only very small parts of the inkjet ink coating, almost perfect adhesion. |
| 2 | Minor parts of the inkjet ink coating was removed by the tape, good adhesion |
| 3 | Parts of the inkjet ink coating were removed by the tape, poor adhesion. |
| 4 | Most of the inkjet ink coating was removed by the tape, poor adhesion. |
| 5 | The inkjet ink was completely removed from the substrate by the tape, no adhesion. |

3. Viscosity

The viscosity of the UV curable compositions was measured at 45° C. and at a shear rate of $1,000 \, s^{-1}$ using a Rotovisco™ RV1 viscometer from HAAKE.

4. Surface Tension

The static surface tension of the UV curable inks was measured with a KRUSS tensiometer K9 from KRUSS GmbH, Germany at 25° C. after 60 seconds.

Example 1

This example illustrates that UV curable inkjet inks can be printed directly on a glass sheet without the need of a primer layer.

Preparation of Concentrated White Pigment Dispersion CPW

A concentrated white pigment dispersion CPW was prepared having a composition according to Table 3.

TABLE 3

| wt % of: | CPW |
|---|---|
| TiO2 | 50.0 |
| E7701 | 10.0 |
| INHIB | 1.0 |
| THFA | 39.0 |

CPW was made by mixing THFA, the white pigment TiO2, the inhibitor INHIB and a 30% solution of the polymeric dispersant E7701 in THFA for 30 minutes according to Table 3 in a vessel equipped with a DISPERLUX™ disperser (from DISPERLUX S.A.R.L., Luxembourg). This mixture was subsequently milled in a DYNO™-MILL ECM from the company WAB Willy A. Bachofen (Switzerland) using 0.40 mm yttrium-stabilized zirconium oxide-beads.

The bead mill was filled for 52% with the grinding beads and operated in recirculation mode at a tip speed of 12 m/s. The milling chamber was water-cooled during the operation. After milling, the concentrated pigment dispersion was discharged over a 1 μm filter into a vessel. The average particle size was 313 nm.

Preparation of Concentrated Black Pigment Dispersion CPK

A dispersion was made by mixing the components according to Table 4 for 30 minutes using a DISPERLUX™ disperser from DISPERLUX S.A.R.L., Luxembourg. The dispersion was then milled using a Netzsch Mini_Zeta mill filled with 0.4 mm yttrium stabilized zirconia beads ("high wear resistant zirconia grinding media" from TOSOH Co.). The mixture was circulated over the mill for 2 hours. After milling, the concentrated pigment dispersion was discharged over a 1 μm filter into a vessel. The milling chamber was water-cooled during the operation. The resulting concentrated pigment dispersion CPK had an average particle size of 137 nm.

TABLE 4

| Component | wt % |
|---|---|
| PB7 | 15.00 |
| E7701 | 15.00 |
| INHIB | 1.00 |
| THFA | 69.00 |

Preparation of UV Curable Inkjet Inks

The UV curable inkjet inks INK-1 to INK-3 were prepared according to Table 5 using the above prepared concentrated pigment dispersion CPW and CPK where necessary. The weight percentages (wt %) were based on the total weight of the UV curable inkjet ink.

TABLE 5

| | UV Curable Inkjet Ink | | |
|---|---|---|---|
| Component | Ink-1 | Ink-2 | Ink-3 |
| EOEOEMA | 37 | 30 | 20 |
| SR9003 | 45 | 20 | 30 |
| CN151 | 7 | 20 | 20 |
| LTM | 7 | 7 | 7 |
| MBF | 3 | 3 | 3 |
| UV3510 | 1 | 1 | 1 |
| TiO2 | — | 10 | — |
| PB7 | — | — | 3 |
| E7701 | — | 2 | 3 |
| THFA | — | 7 | 13 |

Evaluation and Results

Glass substrates were cleaned using isopropanol. The UV curable inkjet inks INK-1 to INK-3 were coated on a glass substrate using a bar coater and a 20 μm wired bar. The samples were cured using a Fusion DRSE-120 conveyer, equipped with a Fusion VPS/I600 lamp (D-bulb), which transported the samples under the UV-lamp on a conveyer belt at a speed of 10 min/min. The adhesion on glass of each coated sample was tested. The results are shown in Table 6.

TABLE 6

| Ink | Adhesion on glass |
|---|---|
| INK-1 | 0 |
| INK-2 | 0 |
| INK-3 | 1 |

From Table 6, it should be clear that the UV curable inkjet inks INK-1 to INK-3 exhibited excellent adhesion results on unprimed glass. The UV curable inkjet INK-1 can be used as primer for standard UV curable inkjet inks.

Example 2

This example illustrates the method of manufacturing laminated glass articles in accordance with the invention.

Preparation of UV Curable Inkjet Ink INK-4

A dispersion of Ink Jet Yellow™ 4GC in phenoxyethyl acrylate (SR339C) was made by mixing 355 g phenoxyethyl acrylate, 500 g of a 30 wt % solution of Solsperse™ 35000 in phenoxy ethyl acrylate, 10 g INHIB) and 300 g Ink Jet Yellow™ 4GC using a Disperlux™ dispenser (from Disperlux S.A.R.L., Luxembourg). Stirring was continued for 30 minutes. The vessel was coupled to Dynomill™ ECM Mulitilab from the company Willy A. Bachofen (Switserland), preloaded with 335 g phenoxyethyl acrylate and filled for 42% with 0.4 mm yttrium stabilized zirconium beads ("high wear resistant zirconia grinding media" from TOSOH Co.). The mixture was circulated over the mill at a flow rate of 200 mL/min and a rotation speed of 10 m/s for a residence time of 22.5 min. During milling an additional amount of 500 g of a 30 wt % solution of Solsperse™ 35000 in phenoxyethyl acrylate was added and milling was continued until a total milling time of 1 hour 44 minutes. DISP-1 was discharged in a 3 liter vessel. The resulting concentrated pigment dispersion DISP-1, according to Table 7, exhibited an average particle size of 140 nm and a viscosity of 168 mPa·s measured at 25° C. using a Haake™ Rotovisco at a shear rate of 10 s$^{-1}$.

TABLE 7

| Component | wt % |
|---|---|
| Ink Jet Yellow 4GC | 15.0 |
| Solsperse ™ 35000 | 15.0 |
| INHIB | 1.0 |
| PEA | 69.0 |

The UV curable inkjet inks INK-4 was prepared according to Table 8 using the above prepared concentrated pigment dispersion DISP-1 where necessary. The weight percentages (wt %) were based on the total weight of the UV curable inkjet ink.

TABLE 8

| wt % of component | INK-4 |
|---|---|
| DISP-1 | 10 |
| EOEOEMA | 34.5 |
| SR9003 | 32 |
| CN151 | 6.5 |
| LTM | 5.7 |
| MBF | 2.5 |
| UV3510 | 0.1 |
| ITX | 4.0 |
| EPD | 4.0 |
| INHIB | 0.7 |

Preparation of Curable Sealing Agent CSA-1

The curable sealing agent CSA-1 was prepared according to Table 9 using the above prepared concentrated pigment dispersion DISP-1 where necessary. The weight percentages (wt %) were based on the total weight of the curable sealing agent CSA-1.

TABLE 9

| wt % of component: | CSA-1 |
|---|---|
| UV3510 | 1 |
| ITX | 4 |
| EPD | 4 |
| Pioloform ™ BL16 | 10 |
| SR531 | 77 |
| IC819 | 2 |
| TPO-L | 2 |

Preparation of Liquid Curable Adhesive Resin Composition CARC-1

The liquid curable adhesive resin composition CARC-1 was prepared according to Table 10 using the above prepared concentrated pigment dispersion DISP-1 where necessary. The weight percentages (wt %) were based on the total weight of the UV curable inkjet ink.

TABLE 10

| wt % of component: | CARC-1 |
|---|---|
| UV3510 | 1 |
| ITX | 4 |
| EPD | 4 |
| SR531 | 82 |
| SR339C | 5 |
| IC819 | 2 |
| TPO-L | 2 |

Preparation of Laminated Glass Article

First, a 1 mm thick floated glass sheet of 14×10 cm was cleaned using isopropanol. Then as an image, the word "AGFA" was jetted on the precleaned glass sheet using the UV curable inkjet ink INK-4. The image was cured using a Fusion DRSE-120 conveyer, equipped with a Fusion VPS/1600 lamp (D-bulb) at a belt speed of 30 m/min at full power of the lamp. The sample was passed 10 times under the lamp.

On the same side of the glass sheet carrying the image, a border having a line width of 4 mm was jetted on the four edges using the curable sealing agent CSA-1. The border was jetted at 2 mm from the glass sheet edge. The border was not completely closed, leaving an opening of 5 mm on one edge. Two glass spacing agents having a thickness of 0.7 mm were placed on two glass sheet edges opposite to each other and positioned between the glass sheet edge and the border of the curable sealing agent CSA-1. A second glass sheet was placed on top of the border and the spacing agents. The glass assembly was cured using a Fusion DRSE-120 conveyer, equipped with a Fusion VPS/1600 lamp (D-bulb) at a belt speed of 30 m/min at full power of the lamp. The sample was passed four times under the lamp leading to a glass laminate precursor having a cavity of 0.7 mm spacing between the two glass plates. The two spacing agents were removed.

The cavity between the first and the second glass sheets, i.e. the interspace 7, was filled with the liquid curable adhesive resin composition CARC-1 using a syringe. After complete filling of the cavity, the opening in the border was closed using the curable sealing agent CSA-1 and the laminated glass panel was cured using a Fusion DRSE-120 conveyer, equipped with a Fusion VPS/1600 lamp (D-bulb) at a belt speed of 30 m/min at full power of the lamp. The sample was passed six times under the lamp. A needle test for trying to damage the interior of the glass laminate indicated complete curing of the interior curable composition.

REFERENCE SIGNS LIST

The meaning of reference signs used in the Drawings is given by Table 11.

TABLE 11

| 1 | First glass sheet |
|---|---|
| 2 | Inkjet printed mage |
| 3 | Sealing agent |
| 4 | Adhesive entry |
| 5 | Cross-section line |
| 6 | Second glass sheet |
| 7 | Interspace |
| 8 | Liquid curable adhesive resin composition |
| 9 | Spacing agents |

The invention claimed is:

1. A method for manufacturing laminated glass articles comprising the steps of:
   inkjet printing an image with at least one inkjet ink on a first glass sheet;
   jetting and at least partially curing a curable sealing agent on at least three edges of the first glass sheet on a first side of the first glass sheet including the inkjet printed image;
   aligning a second glass sheet with the first glass sheet on the first side of the first glass sheet including the at least partially cured sealing agent and the inkjet printed image;
   applying a liquid curable adhesive resin composition into a space between the first glass sheet and the second glass sheet; and
   curing the liquid curable adhesive resin composition until a solid adhesive layer is obtained.

2. The method according to claim 1, further comprising the step of:
   jetting a primer on a glass surface of the first glass sheet; wherein
   the at least one inkjet ink is jetted on the primer.

3. The method according to claim 1, wherein the at least one inkjet ink is jetted on a glass surface of the first glass sheet.

4. The method according to claim 1, wherein the at least one inkjet ink includes at least one UV curable inkjet ink.

5. The method according to claim 1, wherein the curable sealing agent is fully cured after the step of aligning the first glass sheet and the second glass sheet.

6. The method according to claim 1, wherein the curable sealing agent includes an inorganic pigment, a color pigment, or a mixture thereof.

7. The method according to claim 1, wherein the curable sealing agent is jetted by an inkjet printing device that also inkjet printed the at least one inkjet ink.

8. The method according to claim 1, wherein at least one of the liquid curable adhesive resin composition, the at least one inkjet ink, and the primer includes a polyvinylacetal polymer.

9. The method according to claim 8, wherein the polyvinylacetal polymer is a polyvinyl butyral.

10. The method according to claim 1, further comprising the step of:
using spacing agents to control a distance between the second glass sheet and the first glass sheet.

11. The method according to claim 1, wherein the at least one inkjet ink includes at least one free radical photoinitiator, a polyfunctional propoxylated acrylate, and a monofunctional ethoxylated methacrylate according to Formula (I):

Formula (I)

wherein
n represents an integer of 1 to 4; and
R represents an alkyl group, alkenyl group, or alkynyl group.

12. The method according to claim 1, wherein the image is one of a plurality of sub-images that define an original image, and the plurality of sub-images are printed on a plurality of glass sheets.

13. A laminated glass article including information and/or a decoration manufactured by the method according to claim 1.

14. The laminated glass article according to claim 13, wherein spacing agents are located between the second glass sheet and the first glass sheet.

15. The laminated glass article according to claim 13, wherein no double sided tape is present between the second glass sheet and the first glass sheet.

* * * * *